G. W. HAAG.
Potato-Diggers.
No. 138,561.  Patented May 6, 1873.
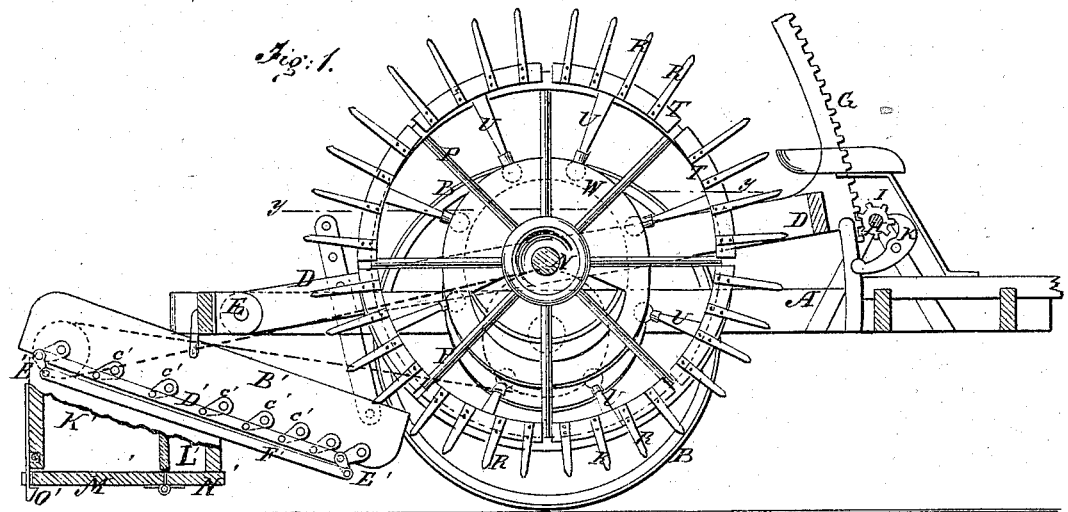
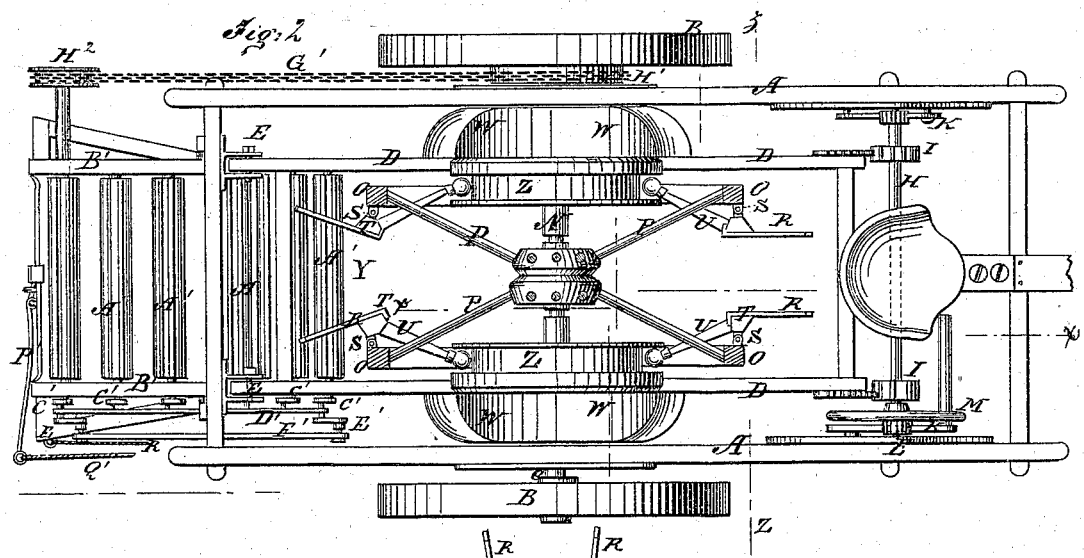
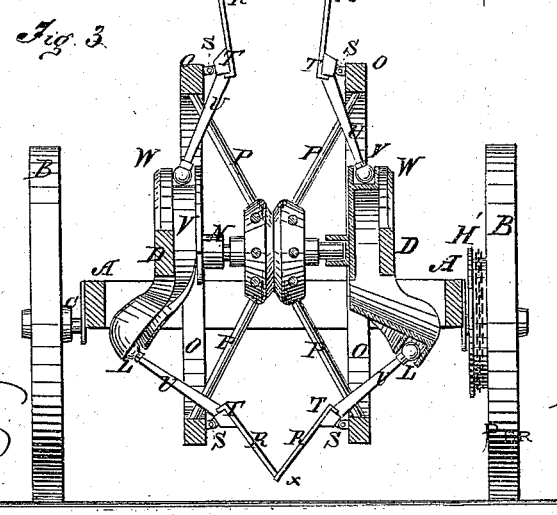
Witnesses:
Chas. Nida
Alex F. Roberts
Inventor:
G. W. Haag
Attorneys.

UNITED STATES PATENT OFFICE.

GEORGE W. HAAG, OF CAIRO, PENNSYLVANIA.

IMPROVEMENT IN POTATO-DIGGERS.

Specification forming part of Letters Patent No. 138,561, dated May 6, 1873; application filed February 8, 1873.

*To all whom it may concern:*

Be it known that I, GEORGE W. HAAG, of Cairo, in the county of Union and State of Pennsylvania, have invented a new and Improved Potato-Digger, of which the following is a specification:

My invention consists of two sets of strong prongs or teeth projecting radially from a couple of rims or wheels mounted on a truck parallel to each other, to revolve in vertical planes, and vertically adjustable, so that the prongs may be forced more or less into the ground as the machine moves along, one set on each side of the row of potatoes to be dug, and the prongs of each set are arranged to swing toward and from each other, and have cams so combined with them that, while being forced into the ground by the weight of the truck, and rotated thereby as it is drawn along, the points of the two sets are caused to swing together under the potatoes so as to hold and raise them, together with some earth, and carry them up over the lower end of an elevator, and then open and let them fall thereon, to be carried up and, at the same time, be separated from the earth, which partly falls away from the teeth and partly through the elevator, and then be delivered into a receptacle behind, which has a trap-bottom with devices for opening and closing it to discharge the accumulations from time to time. My invention also consists of an elevator composed of fluted rollers arranged side by side sufficiently close together to convey the potatoes along from one to another and let the earth fall between in the grooves, the said rollers being connected by cranks and bars at one end, with one to which the driving-power is applied, in a simple manner, for imparting rotary motion to all.

Figure 1 is a longitudinal sectional elevation of my improved machine taken on the line $x$ $x$ of Fig. 2. Fig. 2 is a horizontal section taken on the line $y$ $y$ of Fig. 1, and Fig. 3 is a transverse sectional elevation taken on the line $z$ $z$ of Fig. 2.

Similar letters of reference indicate corresponding parts.

A represents a rectangular truck-frame mounted on two ordinary truck-wheels, B, by short independent axles C, which allow free space within the frame for a secondary frame, D, of similar form, but a little smaller. This frame is pivoted at the rear end to the frame A at E, and at the front end it is supported on the curved toothed bars G rising up from the top of frame A, by the shaft H, pinions I, holding-pawls K, and ratchets L, so arranged that the frame can be readily shifted up and down by turning the shaft, which has a hand-wheel, M, for the purpose. This vertically-adjustable frame carries a horizontal shaft, N, near about its middle, whereon two wheel-rims, O, are mounted, about as far apart as the width of the row of potatoes, in planes parallel with the longitudinal axis of the machine. These rims carry teeth or prongs R on the sides fronting each other, which are radial to the axis of the wheels and pivoted to them at S, so as to be capable of swinging toward and from the middle plane between the wheels. By preference a number of them are connected to a short curved bar or block of wood, T, and as many bars are used as necessary to complete the circles, the said bars being pivoted to the wheel-rims at S, and each bar has an arm, U, connected to it at one end and projecting at right angles therefrom, and radially to the wheel-rim, into a cam-groove, V, in a stationary cam, W, (one for each wheel-rim,) fixed on the frame D, the grooves of which are so shaped that, as the prongs enter the ground at the sides of the row, the points of each set are caused to approach each other so as to meet, as shown at $x$, Fig. 3, by the time they come under the shaft, and they are maintained in this position to secure the potatoes and raise them above the lower end of an elevator, $y$, whereon they are discharged by the separating of the prongs again by the cams, which are suitably formed for separating them at the right points for thus dropping them. The prongs are arranged sufficiently close together circumferentially to hold the potatoes against falling out between them; but as the earth taken up with them will pack to some extent and bind them in, they will not require to be quite as close together as they would need to be to lift them without the earth. These prongs will enter the ground more or less, according to how the frame D is adjusted by the adjusting devices at the front, and they will be lifted entirely above it by the same devices when it is desired to transport the machine along the road.

The elevator consists of a series of grooved or fluted rollers, A', arranged side by side in the frame B', and connected by the cranks C' and bar D' so as to be revolved by power applied to one of the end rollers, and the two end rollers are connected by the cranks E' and bar F', arranged to carry the cranks of all the rollers past the centers without obstruction. The power is applied by an endless chain, G', worked by a pulley, $H^1$, on one of the truck-wheels, and passing over a pulley, $H^2$, on the roller at the upper end of the elevator. The rollers of the upper part of the elevator are arranged far enough apart to allow the largest potatoes to fall between them into the receptacle K' to separate them from the vines and weeds, which are carried over the top. In the lower part they are a little closer together, to allow the small potatoes to fall through into the receptacle L' to be separated from the large ones. The bottoms M' and N' are hinged so as to open downward to discharge the contents in piles from time to time, and they are held closed by self-fastening spring-catches O', with which a trip-lever, P', and trip-cord Q' will be arranged, so that the receptacles can be opened by the driver while in his seat, and a cord, R', will be connected to the doors so as to close them in the same way.

I propose to have the upper rollers of the elevator adjustable to vary the distance between them as may be required by the average size of the potatoes to be dug.

Having thus described my invention, I claim as new and desire to secure by Letters Patent—

1. The combination, in a potato-digging machine, of a pair of wheels, O, with radial oscillating prongs R and cams for working them, substantially in the manner described.

2. The combination of said prong-wheel and an elevator or carrier, y, substantially as specified.

3. The arrangement of the rims O, bars T, prongs R, arms U, and cams V, substantially as specified.

4. The combination of a series of fluted rollers, A', frame B', cranks C', bars D' and F', and cranks E', substantially as specified.

GEO. W. HAAG.

Witnesses:
A. P. THAYER,
T. B. MOSHER.